(12) United States Patent
Cho et al.

(10) Patent No.: US 7,985,508 B2
(45) Date of Patent: Jul. 26, 2011

(54) HIGH TEMPERATURE FUEL CELL SYSTEM HAVING COOLING APPARATUS AND METHOD OF OPERATING THE SAME

(75) Inventors: Chung-kun Cho, Suwon-si (KR); Dong-kwan Kim, Suwon-si (KR); Tae-won Song, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1203 days.

(21) Appl. No.: 11/443,166

(22) Filed: May 31, 2006

(65) Prior Publication Data
US 2007/0031713 A1   Feb. 8, 2007

(30) Foreign Application Priority Data

Aug. 3, 2005   (KR) ........................ 10-2005-0070971

(51) Int. Cl.
*H01M 8/04* (2006.01)
(52) U.S. Cl. ......... 429/429; 429/433; 429/434; 429/437
(58) Field of Classification Search ...................... 429/40
See application file for complete search history.

(56) References Cited

U.S. PATENT DOCUMENTS

| | | | |
|---|---|---|---|
| 5,761,921 A * | 6/1998 | Hori et al. ..................... | 62/238.4 |
| 6,492,044 B1 * | 12/2002 | Walsh ............................. | 429/13 |
| 6,536,546 B2 * | 3/2003 | Roeser et al. ................ | 180/65.1 |
| 2006/0024544 A1 * | 2/2006 | Nielsen et al. ................. | 429/26 |
| 2006/0057454 A1 * | 3/2006 | Nagasawa et al. ............. | 429/44 |

FOREIGN PATENT DOCUMENTS

| | | |
|---|---|---|
| JP | 55-19712 | 2/1980 |
| JP | 61-88462 | 5/1986 |
| JP | 6-52878 | 2/1994 |
| JP | 7-169494 | 7/1995 |
| JP | 2005-38832 | 2/2005 |
| JP | 2005-063733 | * 3/2005 |
| JP | 2005-63733 | 3/2005 |

OTHER PUBLICATIONS

Office Action issued in Korean Patent Application No. 2005-70971 on Sep. 28, 2006.

* cited by examiner

*Primary Examiner* — Ula C Ruddock
*Assistant Examiner* — Jacob Marks
(74) *Attorney, Agent, or Firm* — Lee & Morse, P.C.

(57) ABSTRACT

A high temperature fuel cell system having a cooling apparatus, including: a fuel cell stack including a plurality of membrane electrode assemblies (MEAs) each having an anode electrode and a cathode electrode on opposing surfaces of an electrolyte membrane containing acid and a plurality of conductive plates contacting each electrode; an anode inlet line, which is connected to the fuel cell stack, and which supplies a hydrogen containing gas to the anode electrode; an anode outlet line, which is connected to the fuel cell stack, and which discharges byproducts produced at the anode electrode along with un-reacted hydrogen containing gas; a cathode inlet line, which is connected to the fuel cell stack, and which supplies oxygen to the cathode electrode; a cathode outlet line, which is connected to the fuel cell stack, and which discharges byproducts produced at the cathode electrode along with un-reacted oxygen; a cooling apparatus, which is installed at the anode inlet line, and which reduces a temperature of the hydrogen containing gas; and a moisture removing device that removes moisture from the hydrogen containing gas.

8 Claims, 2 Drawing Sheets

HIGH TEMPERATURE FUEL CELL SYSTEM HAVING COOLING APPARATUS AND METHOD OF OPERATING THE SAME

CROSS-REFERENCE TO RELATED APPLICATION

This application claims the benefit of Korean Patent Application No. 2005-70971, filed Aug. 3, 2005, in the Korean Intellectual Property Office, the disclosure of which is incorporated herein by reference.

BACKGROUND OF THE INVENTION

1. Field of the Invention

An aspect of the present invention relates to a high temperature fuel cell system having a cooling apparatus, and a method of operating the same, and, more particularly, to a high temperature fuel cell system that increases a moisture removal efficiency of the fuel cell system by reducing the temperature of a hydrogen containing gas entering the fuel cell system using a moisture removing apparatus installed at a bypass line of the hydrogen containing gas, and a method of operating the same.

2. Description of the Related Art

A fuel cell is an electrical generation system that transforms chemical energy directly into electrical energy through a chemical reaction between oxygen and hydrogen contained in a hydrocarbon group material, such as methanol, ethanol, or natural gas. Types of fuel cells include phosphoric acid fuel cells, molten carbonate fuel cells, solid oxide fuel cells, and polymer electrolyte membrane or alkaline fuel cells, each of which is classified according to the type of electrolyte used therein. These fuel cells all operate on similar basic principles, but have their own operating characteristics according to their types of fuel, operating temperatures, catalysts, and electrolytes.

The polymer electrolyte membrane fuel cell (PEMFC) has the advantages of superior output, a low operating temperature, rapid starting, and speedy response time compared to other fuel cells, and is, therefore, a common fuel cell in the automotive and portable device industries and in residential and small commercial applications.

The polymer electrolyte membranes of the PEMFC have generally been formed of a polymer electrolyte such as perfluorosulfonic acid polymer, such as NAFION™. The polymer electrolyte membrane functions as a high ionic conductor by containing an adequate amount of water.

Conventional PEMFCs are generally operated at a temperature below 100° C., e.g., about 80° C., due to a drying problem of the polymer electrolyte membrane. Conventional PEMFCs have the following problems due to the low operating temperature. A hydrogen-rich gas, which is a representative fuel for the PEMFC, is obtained by reforming an organic fuel such as natural gas or methanol. In the reforming process, carbon dioxide and carbon monoxide may be present as byproducts in the hydrogen-rich gas, and carbon monoxide may poison catalysts contained in a cathode and an anode. The electrochemical activity of the poisoned catalysts is greatly reduced, and, accordingly, the operational efficiency and lifetime of the PEMFC are seriously reduced. The lower the operating temperature of the PEMFC, the worse the catalyst poisoning by carbon monoxide tends to be.

When the operating temperature of the PEMFC is higher than 150° C., catalyst poisoning by carbon monoxide may be avoided, and the water management of the PEMFC may be more easily controlled. Therefore, the fuel reformer may be miniaturized and the cooling apparatus can be simplified, thereby miniaturizing the overall PEMFC system.

The electrolyte membrane used for a high temperature fuel cell uses acid instead of water as a hydrogen ion conductor. Accordingly, the maintenance of the acid content in the electrolyte membrane is very important. Since acid is water soluble, it is easily leached through an electrode on contact with water. Accordingly, direct contact between the acid and the water should be avoided. Under typical operating conditions, however, water may be present as a vapor since the operating temperature of the fuel cell is approximately 150° C.

In this case, when the operation of the fuel cell is stopped, water is generated at the electrode as the fuel cell stack cools. Therefore, the acid contained in the electrolyte membrane will be leached away. Accordingly, the prevention of water generation at the electrode layer even if the fuel cell is cooled is important.

U.S. Pat. No. 6,492,044 has disclosed a method of including a desiccant in the fuel cell to prevent the generation of water at the electrode when the fuel cell cools down. However, this method may not sufficiently remove water vapor from pores of the electrode. In addition, more desiccant must be used as the number of unit fuel cells increases.

SUMMARY OF THE INVENTION

The present invention provides a high temperature fuel cell system having a cooling apparatus to relatively effectively remove water vapor from a hydrogen containing gas entering a fuel cell stack when the operation of the high temperature fuel cell system is stopped, and a method of operating the high temperature fuel cell system.

According to an aspect of the present invention, there is provided a high temperature fuel cell system having a cooling apparatus, comprising: a fuel cell stack including a plurality of membrane electrode assemblies (MEAs) each having an anode electrode and a cathode electrode on opposing surfaces of an electrolyte membrane containing acid and a plurality of conductive plates contacting each electrode; an anode inlet line, which is connected to the fuel cell stack, and which supplies a hydrogen containing gas to the anode electrode; an anode outlet line, which is connected to the fuel cell stack, and which discharges byproducts produced at the anode electrode along with un-reacted hydrogen containing gas; a cathode inlet line, which is connected to the fuel cell stack, and which supplies oxygen to the cathode electrode; a cathode outlet line, which is connected to the fuel cell stack, and which discharges byproducts produced at the cathode electrode along with un-reacted oxygen; a cooling apparatus, which is installed at the anode inlet line, and which reduces a temperature of the hydrogen containing gas; and a moisture removing device that removes moisture from the hydrogen containing gas.

The cooling apparatus installed in front of the moisture removing device may be connected to a bypass line which is installed in front of the moisture removing device in a gas flow direction of the anode inlet line.

The bypass line may comprise valves that selectively allow the hydrogen containing gas to flow through the cooling apparatus.

The cooling apparatus may comprise a pipe that surrounds the bypass line, and through which cooling water flows.

According to another aspect of the present invention, the cooling apparatus may be a thermoelectric element having a cold junction inside the bypass line and hot junctions outside the bypass line.

The moisture removing device may be a desiccant.

According to an aspect of the present invention, there is provided a method of operating a high temperature fuel cell system having a cooling apparatus installed therein. The method comprises shutting down the high temperature fuel cell system by reducing the temperature of the hydrogen containing gas by passing the hydrogen containing gas through the cooling apparatus, and operating the high temperature fuel cell system by supplying the hydrogen containing gas to the fuel cell stack without passing the hydrogen containing gas through the cooling apparatus.

The shutting down the high temperature fuel cell system may include cooling the hydrogen containing gas to a temperature higher than the dew point of the hydrogen containing gas.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
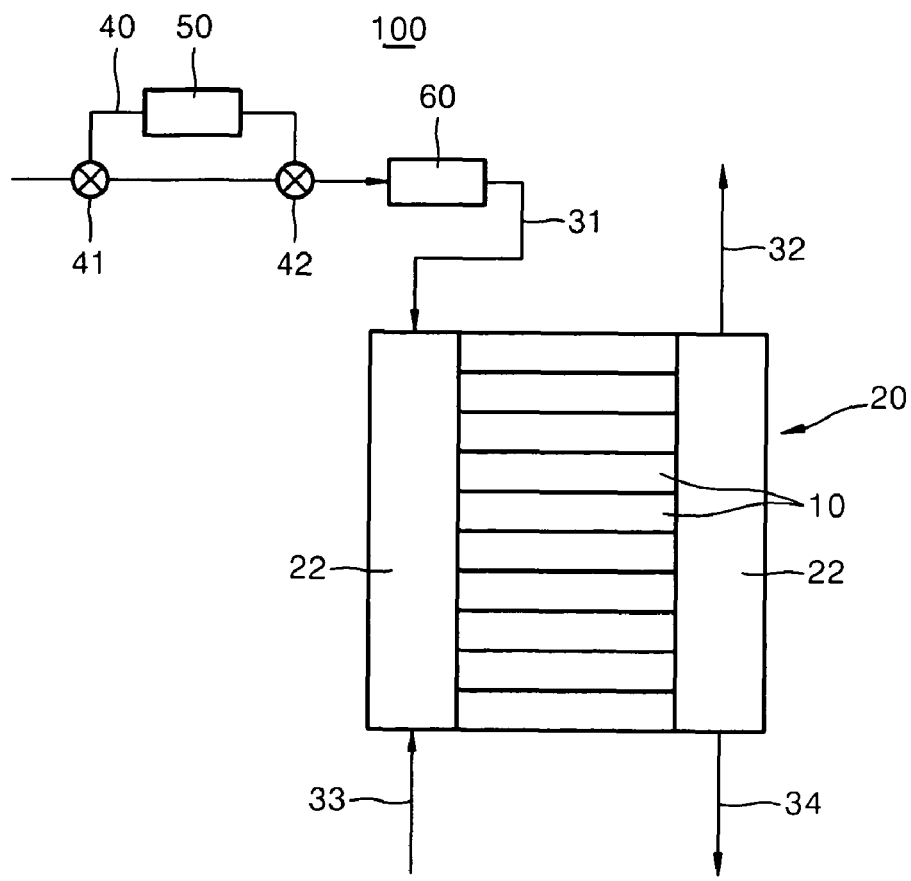
FIG. 1 is a schematic diagram showing the configuration of a high temperature fuel cell system according to the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
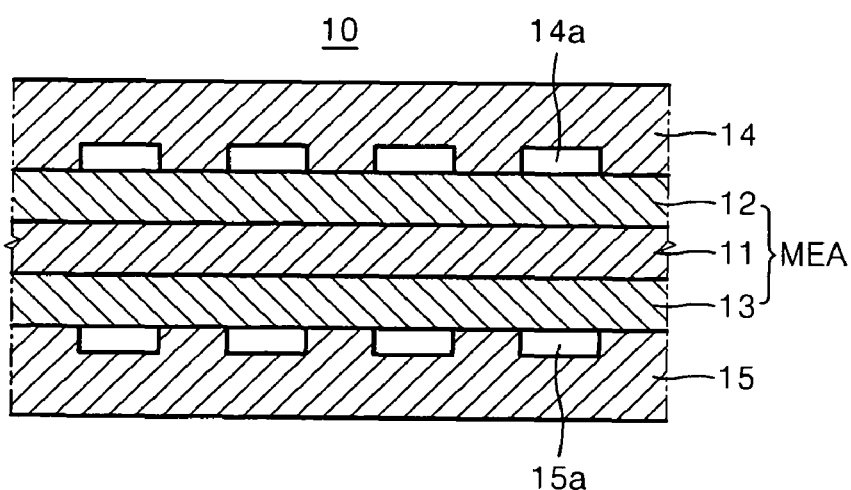
FIG. 2 is a cross-sectional view illustrating the configuration of a unit cell applied to the present invention.

FIG. 1 is a schematic diagram showing the configuration of a high temperature fuel cell system according the present invention. As shown in FIG. 1, a high temperature fuel cell system 100 according to the present invention includes a fuel cell stack 20 having tens or hundreds of unit cells 10. As depicted in FIG. 2, each unit cell 10 includes a membrane electrode assembly (MEA). The MEA includes an anode electrode 12 on a first surface and a cathode electrode 13 on a second surface of an electrolyte membrane 11 impregnated with phosphoric acid. Conductive plates 14 and 15 that respectively supply a hydrogen containing gas and an oxygen containing gas to the electrodes 12 and 13 are formed on both surfaces of the MEA. Reference numerals 14a and 15a indicate gas flow channels.

An anode inlet line 31 through which the hydrogen containing gas is supplied to the anode electrode 12, and an anode outlet line 32 through which reaction products from the anode electrode 12 and unreacted hydrogen containing gas are discharged from the anode electrode 12, are coupled to the fuel cell stack 20. A cathode inlet line 33 through which an oxygen containing gas (air) is supplied to the cathode electrode 13, and a cathode outlet line 34 through which reaction products from the cathode electrode 13 and unreacted air are discharged from the cathode electrode 13, are coupled to the cathode electrode 13. The fuel cell stack 20 includes a through hole 22 to which the anode inlet line 31, the anode outlet line 32, the cathode inlet line 33, and the cathode outlet line 34 are connected. The fuel cell stack 20 normally includes at least four through holes 22, but for convenience of explanation, two through holes 22 are depicted in FIG. 1. Each through hole 22 is, respectively, connected to each of the four gas lines 31 through 34.

The anode inlet line 31 includes a bypass line 40 for the hydrogen containing gas. First and second three-way valves 41 and 42 are installed on both ends of the bypass line 40. The bypass line 40 includes a cooling apparatus 50 for cooling the hydrogen containing gas. The cooling apparatus 50 cools the hydrogen containing gas from approximately 150° C. to a temperature higher than the dew point of the hydrogen containing gas.

A moisture removing device 60 to remove water vapor contained in the hydrogen containing gas that has passed through the cooling apparatus 50 is installed at the anode inlet line 31 between the second three-way valve 42 and the fuel cell stack 20. The moisture removing device 60 absorbs moisture in the hydrogen containing gas, which dissolves acid contained in the electrolyte membrane 11. The moisture removing device 60 may be a desiccant that contacts the hydrogen containing gas passing through the anode inlet line 31. The desiccant may be, for example, silica gel or a molecular sieve.

The hydrogen containing gas supplied to the anode electrode 12 of the high temperature fuel cell system 100 has a temperature of approximately 150° C., and is composed of approximately $CO_2+5H_2+H_2O$.

Meanwhile, when the operation of the high temperature fuel cell system 100 is stopped, the hydrogen containing gas that is supplied to the anode electrode 12 is cooled to room temperature, and, at this time, of the 1 mol of water, ⅚ mol is present as a liquid and ⅙ mol is present as a vapor. If liquid water is present at the anode electrode 12, the liquid water dissolves phosphoric acid of the electrolyte membrane 11, resulting in the reduction of the phosphoric acid concentration in the electrolyte membrane 11, thereby reducing the efficienly of the fuel cell.

The cooling apparatus 50 cools the temperature of the hydrogen containing gas, which is used to expel water remaining at the anode electrode 12 through the anode outlet line 32, and the moisture removing device 60 readily removes water contained in the cooled hydrogen containing gas.

The cooling apparatus 50 reduces the temperature of the hydrogen containing gas entering the anode electrode 12 from 150° C. to a temperature that is higher than the dew point of 65° C., for example 70 to 75° C. When the temperature of the hydrogen containing gas is reduced, the moisture removing device 60 readily removes moisture from the hydrogen containing gas. That is, the cooling apparatus 50 increases the amount of moisture removed by the moisture removing device 60. The hydrogen containing gas which passes through the moisture removing device 60 discharges water remaining at the anode electrode 12 through the anode outlet line 32.

Figure 3:
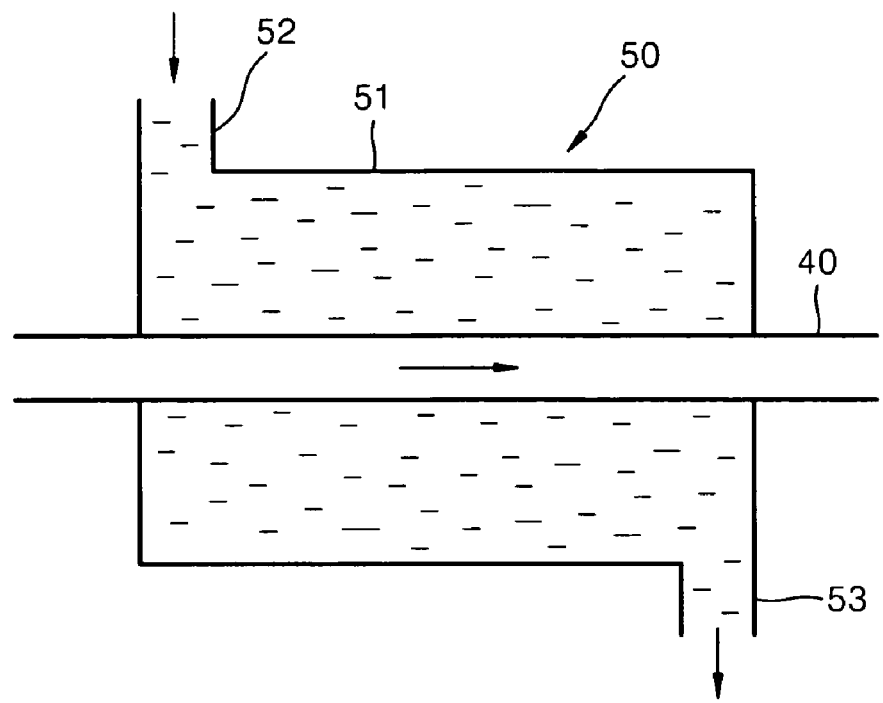
FIG. 3 is a cross-sectional view of the configuration of a cooling apparatus according to an embodiment of the present invention.

FIG. 3 is a cross-sectional view of the configuration of a cooling apparatus according to an embodiment of the present invention. Referring to FIG. 3, the cooling apparatus 50 includes a pipe 51 that surrounds the bypass line 40 through which the hydrogen containing gas passes. The pipe 51 includes an inlet 52 and an outlet 53, and the hydrogen containing gas passing through the bypass line 40 is cooled by a coolant, such as water or air, flowing through the inlet 52 and the outlet 53.

Figure 4:
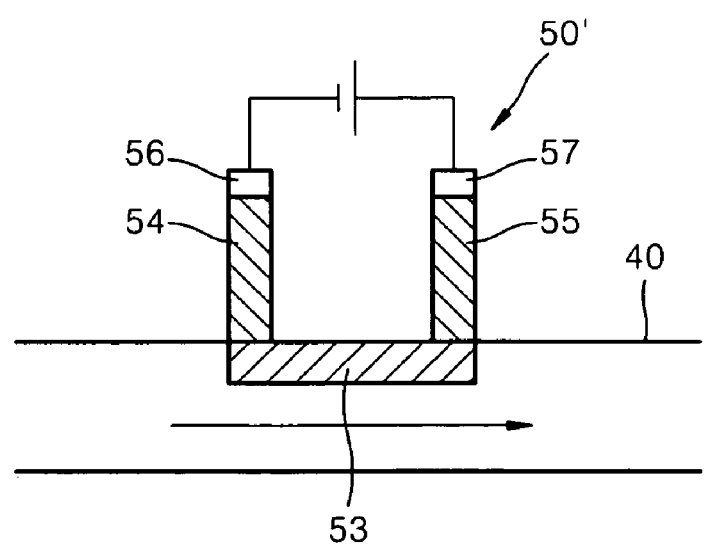
FIG. 4 is a cross-sectional view of the configuration of a cooling apparatus according to another embodiment of the present invention.

FIG. 4 is a cross-sectional view of the configuration of a cooling apparatus, according to another embodiment of the present invention. As shown in FIG. 4, the cooling apparatus 50' may be a thermoelectric element. When the cold junction 53 is placed in the bypass line 40, and a direct current is applied to a p-type material 54 and an n-type material 55 mounted on either side of a cold junction 53 of the thermoelectric element, the cold junction 53 absorbs heat and hot junctions 56 and 57 dissipate the heat. Accordingly, the inside of the bypass line 40 is cooled. The cooling degree of the thermoelectric element may be controlled by controlling the direct current applied to the thermoelectric element.

The operation of the high temperature fuel cell system according to aspects of the present invention will now be described with reference to FIG. 1.

To shut down the high temperature fuel cell system 100, the first and second three-way valves 41 and 42 are controlled so that the hydrogen containing gas passes through the cooling apparatus 50 of the bypass line 40. The cooling apparatus 50 cools down the hydrogen containing gas to a temperature higher than the dew point of 65° C., for example 70 to 75° C. The hydrogen containing gas cooled by the cooling apparatus 50 enters the high temperature fuel cell system 20 after moisture is removed while passing through the moisture removing device 60. Also, the moisture remaining at the anode electrode 12 is blown out to the outside through the anode outlet line 32 using the hydrogen containing gas. Accordingly, the leaching of the phosphoric acid of the electrolyte membrane 11 by moisture may be prevented, thereby increasing the lifetime of the high temperature fuel cell system 100.

To restart the high temperature fuel cell system 100, the first and second three-way valves 41 and 42 are controlled so that the hydrogen containing gas cannot pass through the bypass line 40. Then, the hydrogen containing gas, at a temperature of approximately 150° C., evaporates the moisture absorbed in the desiccant while passing through the moisture removing device 60 and is discharged to the outside through the fuel cell stack 20 and the anode outlet line 32. The dried desiccant may be reused to remove moisture when the high temperature fuel cell system 100 shuts down.

The high temperature fuel cell system, according to aspects of the present invention, prevents the leaching of acid contained in the electrolyte membrane when shutting down, by increasing the moisture removal efficiency of a moisture removing device by reducing the temperature of a hydrogen containing gas that enters the moisture removing device using a cooling apparatus installed in a bypass line, thereby increasing the lifetime of the high temperature electrolyte membrane.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A high temperature fuel cell system having a cooling apparatus, comprising:
   a fuel cell stack including a plurality of membrane electrode assemblies (MEAs) each having an anode electrode and a cathode electrode on opposing surfaces of an electrolyte membrane containing acid and a plurality of conductive plates contacting each electrode;
   an anode inlet line, which is connected to the fuel cell stack, and which supplies a hydrogen containing gas to the anode electrode;
   an anode outlet line, which is connected to the fuel cell stack, and which discharges byproducts produced at the anode electrode along with un-reacted hydrogen containing gas;
   a cathode inlet line, which is connected to the fuel cell stack, and which supplies oxygen to the cathode electrode;
   a cathode outlet line, which is connected to the fuel cell stack, and which discharges byproducts produced at the cathode electrode along with un-reacted oxygen;
   a cooling apparatus, which is installed at the anode inlet line, and which reduces a temperature of the hydrogen containing gas;
   a moisture removing device that removes moisture from the hydrogen containing gas; and
   a bypass line which is parallelly installed ahead of the moisture removing device in a gas flow direction of the anode inlet line, wherein the cooling apparatus is connected to the bypass line, and the hydrogen containing gas passing though the bypass line enters the fuel cell stack,
   wherein the bypass line comprises valves that selectively allow the hydrogen containing gas to flow through the cooling apparatus,
   wherein in shutting down the fuel cell system, the valves are controlled so that the hydrogen containing gas passes through the cooling apparatus of the bypass line, and
   wherein in operating the fuel cell system, the valves are controlled so that the hydrogen containing gas cannot pass through the cooling apparatus of the bypass line.

2. The high temperature fuel cell system of claim 1, wherein the cooling apparatus comprises a pipe that surrounds the bypass line, and through which cooling water flows.

3. The high temperature fuel cell system of claim 1, wherein the cooling apparatus is a thermoelectric element having a cold junction inside the bypass line and hot junctions outside the bypass line.

4. The high temperature fuel cell system of claim 1, wherein the moisture removing device comprises a desiccant.

5. The high temperature fuel cell system of claim 4, wherein the desiccant comprises silica gel and/or a molecular sieve.

6. A method of operating a high temperature fuel cell system having the cooling apparatus of claim 1 installed therein, the method comprising:
   reducing the temperature of the hydrogen containing gas by passing the hydrogen containing gas through the cooling apparatus in shutting down the fuel cell system, wherein the hydrogen containing gas enters the fuel cell stack; and
   supplying the hydrogen containing gas to the high temperature fuel cell stack without passing the hydrogen containing gas through the cooling apparatus in operating the fuel cell system.

7. The method of claim 6, wherein the shutting down of the high temperature fuel cell system comprises cooling the hydrogen containing gas to a temperature higher than the dew point of the hydrogen containing gas.

8. The method of claim 7, wherein the cooling of the hydrogen containing gas comprises cooling the hydrogen containing gas to a temperature of 70 to 75° C.

* * * * *